(12) United States Patent
Mitchell

(10) Patent No.: US 12,515,799 B2
(45) Date of Patent: Jan. 6, 2026

(54) WIRELESS POWER PASSENGER SEAT

(71) Applicant: B/E Aerospace, Inc., Winston-Salem, NC (US)

(72) Inventor: James P Mitchell, Cedar Rapids, IA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 270 days.

(21) Appl. No.: 18/230,034

(22) Filed: Aug. 3, 2023

(65) Prior Publication Data

US 2025/0042549 A1    Feb. 6, 2025

(51) Int. Cl.
*B64D 11/06* (2006.01)
*B64D 11/00* (2006.01)

(52) U.S. Cl.
CPC .. *B64D 11/0624* (2014.12); *B64D 2011/0053* (2013.01)

(58) Field of Classification Search
CPC .............. A47C 7/725; B64D 11/00155; B64D 2011/0038; B64D 2011/0053
USPC ............................................ 297/217.3, 217.6
See application file for complete search history.

(56) References Cited

U.S. PATENT DOCUMENTS

| | | |
|---|---|---|
| 5,936,380 A | 8/1999 | Parrish |
| 6,614,126 B1 | 9/2003 | Mitchell |
| 6,929,218 B1 | 8/2005 | Sanford et al. |
| 7,027,767 B2 * | 4/2006 | de La Chapelle . B64D 11/0624 455/3.06 |
| 7,483,696 B1 * | 1/2009 | Mitchell ............ H04B 7/18508 455/431 |
| 7,503,522 B2 | 3/2009 | Henley et al. |
| 7,514,899 B2 * | 4/2009 | Deng-Peng ............. H02J 50/90 320/101 |
| 7,599,691 B1 | 10/2009 | Mitchell |
| 8,274,383 B2 | 9/2012 | Mitchell et al. |
| 9,146,438 B2 | 9/2015 | Mitchell et al. |
| 9,584,618 B1 | 2/2017 | Mitchell |
| 9,960,624 B2 | 5/2018 | Ibrahim |
| 10,135,285 B2 | 11/2018 | Ayotte |
| 10,464,675 B1 * | 11/2019 | Rabii ..................... G08C 17/02 |
| 10,919,446 B1 | 2/2021 | Camp |
| 10,953,987 B2 | 3/2021 | Johnson et al. |
| 10,985,584 B2 | 4/2021 | Hakla et al. |

(Continued)

FOREIGN PATENT DOCUMENTS

| | | |
|---|---|---|
| EP | 2546145 A1 | 1/2013 |
| WO | 9904381 A1 | 1/1999 |

OTHER PUBLICATIONS

European Patent Office, Extended European Search Report received in EP Application No. 24192911.6, Sep. 27, 2024, 5 pages.

*Primary Examiner* — Jose V Chen
(74) *Attorney, Agent, or Firm* — Suiter Swantz IP

(57) ABSTRACT

A passenger seat is wirelessly powered. A combination of solid-state battery technology, photovoltaics, and LED arrays provide electrical power to an interactive display in a wireless power system. The LED arrays include redundant LEDs which are selected based on seat position and wireless feedback. The system uses solar window energy to offset the power requirements of the arrays, making the wireless power system more green or renewable. The LED arrays provides power when the solar window energy is unavailable, enabling robust power availability.

18 Claims, 9 Drawing Sheets

(56) References Cited

U.S. PATENT DOCUMENTS

| | | | |
|---|---|---|---|
| 11,029,574 B2 * | 6/2021 | Avila | B64D 11/00155 |
| 11,407,513 B2 | 8/2022 | Koehn | |
| 11,427,347 B2 * | 8/2022 | Gut | B64D 11/0015 |
| 2007/0044126 A1 | 2/2007 | Mitchell | |
| 2007/0057122 A1 | 3/2007 | Lee et al. | |
| 2011/0069958 A1 * | 3/2011 | Haas | H04B 10/1149 |
| | | | 398/140 |
| 2012/0008336 A1 * | 1/2012 | Mueller | B60Q 3/43 |
| | | | 362/555 |
| 2013/0093220 A1 | 4/2013 | Pajic | |
| 2014/0169012 A1 | 6/2014 | Ehlers et al. | |
| 2014/0252813 A1 * | 9/2014 | Lee | H02J 50/12 |
| | | | 297/180.12 |
| 2016/0137282 A1 * | 5/2016 | Hontz | H02J 7/35 |
| | | | 244/129.3 |
| 2017/0141600 A1 * | 5/2017 | Kuczek | B64D 11/00155 |
| 2018/0257755 A1 | 9/2018 | Avila et al. | |
| 2019/0027972 A1 * | 1/2019 | Gietzold | B64D 31/16 |
| 2019/0157905 A1 * | 5/2019 | Zurian | H02J 50/10 |
| 2020/0068358 A1 * | 2/2020 | Macrae | B64D 11/00155 |
| 2020/0216176 A1 * | 7/2020 | Ma | H04W 4/48 |
| 2021/0194292 A1 | 6/2021 | Duhovnikov et al. | |
| 2021/0380255 A1 | 12/2021 | Lin et al. | |
| 2022/0048629 A1 * | 2/2022 | Noshari | B64D 11/06 |
| 2022/0117025 A1 * | 4/2022 | Narukami | H04W 76/30 |
| 2023/0034020 A1 * | 2/2023 | Yalla | B64D 11/0629 |
| 2023/0111916 A1 * | 4/2023 | Nelson | A47C 7/748 |
| | | | 297/217.6 |
| 2023/0166844 A1 * | 6/2023 | Vogel | B64D 11/0624 |

* cited by examiner

WIRELESS POWER PASSENGER SEAT

TECHNICAL FIELD

The present invention generally relates to seats and more specifically to seats with wireless power.

BACKGROUND

Passenger seats in aircraft include displays which are power from tracks that run underneath or along the seats. The tracks function as power lines for the passenger seats. Providing the power lines to passenger seats is a challenge when reconfiguring the seats. The power lines also incur a significant weight to the aircraft. Therefore, it would be advantageous to provide a device, system, and method that cures the shortcomings described above.

SUMMARY

A seat group is described, in accordance with one or more embodiments of the present disclosure. The seat group include a passenger seat. The passenger seat includes a seat back. The passenger seat includes a seat pan. The passenger seat includes one or more electrical loads. The seat group includes one or more photovoltaic cells coupled to the passenger seat. The one or more photovoltaic cells are configured to receive light and convert the light into electricity. The passenger seat includes one or more batteries. The one or more batteries are rechargeable. The electricity from the one or more photovoltaic cells recharges the one or more batteries. The one or more batteries deliver power to the one or more electrical loads.

In some embodiments, the one or more electrical loads comprise at least one of: a display or an electrical outlet. The display is disposed in the seat back.

In some embodiments, the seat group includes a light pipe. The one or more electrical loads comprise the display. The light pipe is configured to receive the light and transport the light to the display for backlighting the display.

In some embodiments, the light pipe comprises an inlet. At least one of: the inlet is on top of the seat back, the inlet is disposed at an outboard side of the seat pan, or the inlet is disposed underneath the seat pan. The light pipe receives the light at the inlet.

In some embodiments, the one or more batteries are exclusively charged from the photovoltaic cells. The one or more electrical loads are exclusively powered from the one or more batteries.

An aircraft is described, in accordance with one or more embodiments of the present disclosure. The aircraft includes a seat group. The seat group includes a passenger seat. The passenger seat includes a seat back. The passenger seat includes a seat pan. The passenger seat includes one or more electrical loads. The seat group includes one or more photovoltaic cells coupled to the passenger seat. The one or more photovoltaic cells are configured to receive light and convert the light into electricity. The seat group includes one or more batteries. The one or more batteries are rechargeable. The electricity from the one or more photovoltaic cells recharges the one or more batteries. The one or more batteries deliver power to the one or more electrical loads. The aircraft includes one or more arrays. The one or more arrays each comprise a plurality of light emitting diodes. The one or more arrays are configured to emit the light. The light propagates to the one or more photovoltaic cells in free space.

In some embodiments, the light comprises at least one of visible light, infrared light, or ultraviolet light.

In some embodiments, the one or more arrays comprise a diffuser. Light emitted from the plurality of light emitting diodes passes through the diffuser.

In some embodiments, the aircraft includes a passenger service unit. The one or more arrays comprise a passenger service unit array. The passenger service unit array is coupled to the passenger service unit. The one or more photovoltaic cells comprise one or more seat-top photovoltaic cells. The one or more seat-top photovoltaic cells are disposed on top of the seat back. The one or more seat-top photovoltaic cells receive light from the passenger service unit array.

In some embodiments, the aircraft includes a sidewall. The one or more arrays comprise a sidewall array coupled to the sidewall. The one or more photovoltaic cells comprise one or more seat pan photovoltaic cells. The one or more seat pan photovoltaic cells are coupled to the seat pan. The one or more seat pan photovoltaic cells are configured to receive the light from the sidewall array.

In some embodiments, the aircraft includes a light pipe. The one or more electrical loads comprise a display. The light pipe is configured to receive the light from the sidewall array and transport the light to the display for backlighting the display.

In some embodiments, the aircraft includes a floor. The one or more arrays comprise a floor array coupled to the floor below the passenger seat. The one or more photovoltaic cells comprise one or more under-seat photovoltaic cells. The one or more under-seat photovoltaic cells are coupled to the passenger seat below the seat pan. The one or more under-seat photovoltaic cells are configured to receive the light from the floor array.

In some embodiments, the aircraft includes a window. The one or more photovoltaic cells comprise one or more window photovoltaic cells. The one or more window photovoltaic cells are disposed at a height of the window. The one or more window photovoltaic cells are configured to receive sunlight from the window.

In some embodiments, the aircraft includes one or more power sources. The one or more arrays receive electrical power from the power sources for emitting the light. The one or more power sources comprise an auxiliary power unit.

In some embodiments, the aircraft includes a window. The one or more power sources comprise a solar window shade. The window solar shade is coupled to the window. The window solar shade receives sunlight and generates electricity from the sunlight.

In some embodiments, the aircraft includes an array controller. The array controller is configured to control a power of the one or more arrays.

In some embodiments, the array controller is configured to detect when the one or more photovoltaic cells receive sunlight and reduce the power of the one or more arrays in response to detecting the one or more photovoltaic cells receive the sunlight.

In some embodiments, the array controller is configured to detect a state of charge of the one or more batteries and control the power of the one or more arrays based on the state of charge.

In some embodiments, the array controller is configured to turn on and off the plurality of light emitting diodes of the one or more arrays to detect a position of the seat back using a feedback mechanism from the one or more photovoltaic cells.

In some embodiments, the aircraft includes a proximity sensor. The proximity sensor is configured to generate a seat-occupied signal and a seat-vacant signal. The array controller is configured to reduce the power of the one or more arrays in response to receiving the seat-occupied signal. The array controller is configured to increase the power of the one or more arrays in response to receiving the seat-vacant signal.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
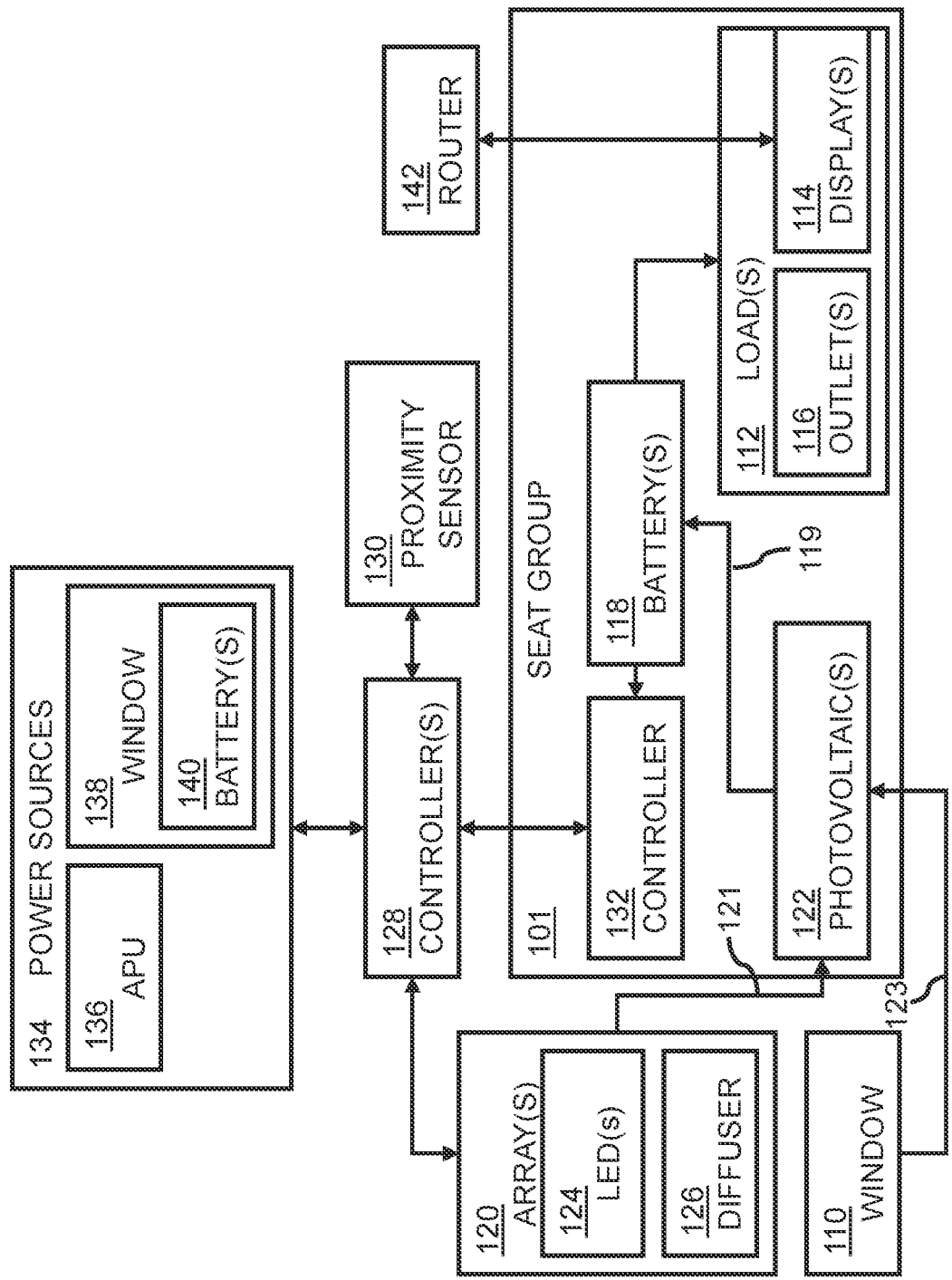
FIG. 1A depicts a simplified block diagram of an aircraft including a seat group, in accordance with one or more embodiments of the present disclosure.
Figure 1B:
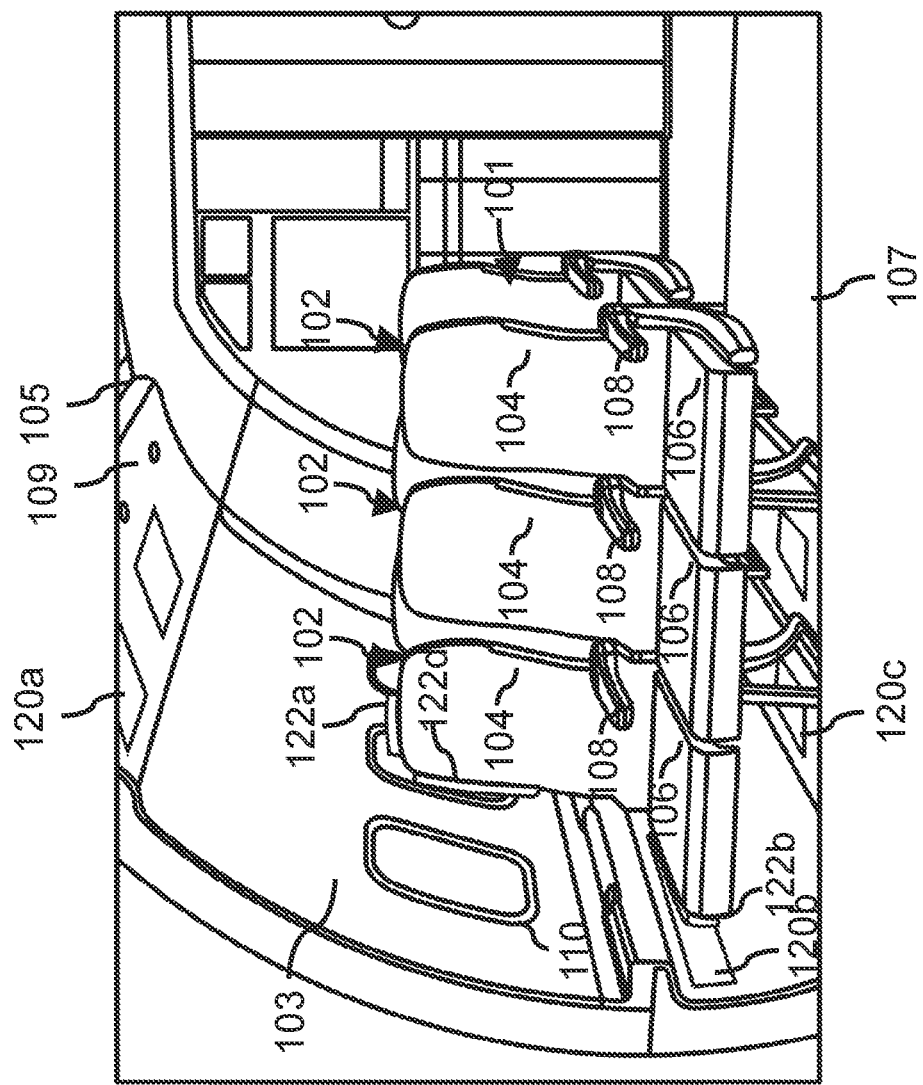
FIG. 1B depicts a front perspective view of a seat group of an aircraft, in accordance with one or more embodiments of the present disclosure.
Figure 1C:
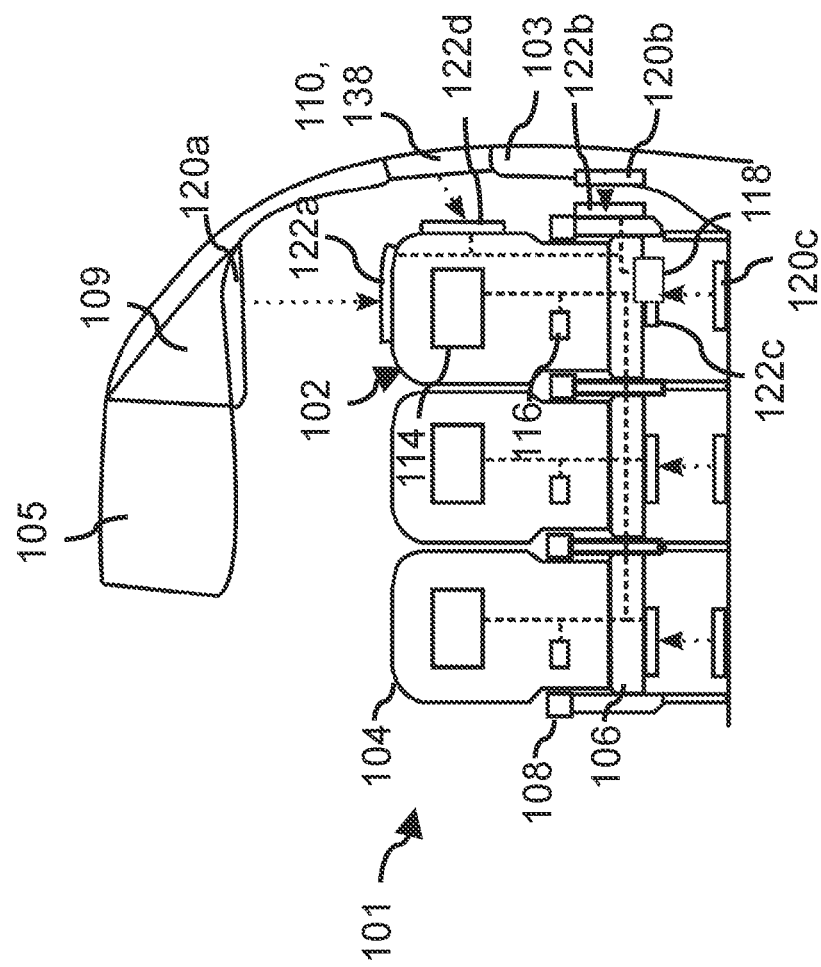
FIGS. 1C-1D depict a rear view of a seat group of an aircraft, in accordance with one or more embodiments of the present disclosure.
Figure 1D:
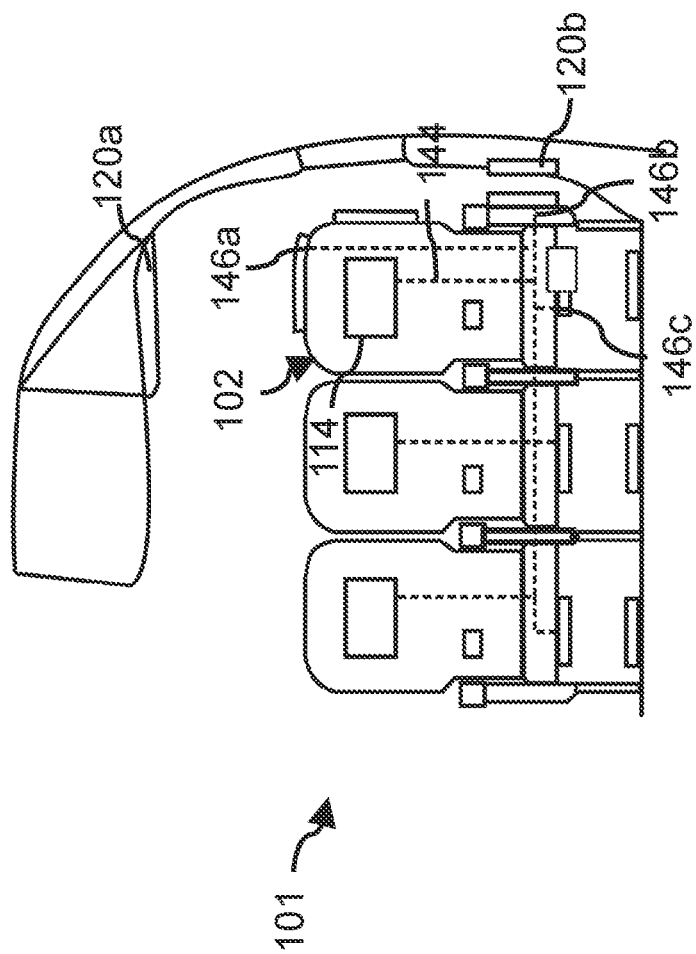

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to passenger seats which are wirelessly powered. A combination of solid-state battery technology, photovoltaics, and LED arrays provide electrical power to an interactive display in a wireless power system. The LED arrays include redundant LEDs which are selected based on seat position and wireless feedback. The system uses solar window energy to offset the power requirements of the arrays, making the wireless power system more green or renewable. The LED arrays provides power when the solar window energy is unavailable, enabling robust power availability.

U.S. Patent Publication Number 2016/0137282, titled "Solar window shade"; U.S. Pat. No. 6,614,126, titled "Integrated lighting and data communication apparatus"; U.S. Pat. No. 11,427,347, titled "Cabin interior arrangement comprising a power transfer arrangement for an aircraft, and aircraft comprising the cabin interior arrangement"; U.S. Pat. No. 7,027,767, titled "Mobile platform local area network using direct infrared"; U.S. Pat. No. 9,146,438, titled "Self-powered dimmable windows with integrated controls"; U.S. Pat. No. 10,135,285, titled "Wireless power for vehicular passenger seats"; U.S. Patent Publication Number 2007/0057122, titled "Overhead video system for an aircraft"; U.S. Pat. No. 10,919,446, titled "Integrated sidewall light"; U.S. Patent Publication Number 2021/0194292, titled "Methods and systems for wireless power transfer"; are incorporated herein by reference in the entirety.

Referring now to FIGS. 1A-1D, an aircraft 100 is described, in accordance with one or more embodiments of the present disclosure. The aircraft 100 includes one or more components, such as, but not limited to, one or more seat groups 101, a sidewall 103, an overhead compartment 105, a floor 107, a passenger service unit 109, windows 110, arrays 120, array controllers 128, proximity sensors 130, power sources 134, routers 142, and the like.

The aircraft 100 includes the seat groups 101. The seat groups 101 are separated from adjacent of the seat groups 101 in a fore-and-aft configuration. The separation of the seat groups 101 in the fore-and-aft configuration defines a leg-room area. The seat groups 101 are separated from adjacent of the seat groups 101 in a side-by-side configuration. The separation of the seat groups 101 in the side-by-side configuration defines an aisle. The seat groups 101 include multiple of the passenger seats 102. For example, the seat groups 101 may include three of the passenger seats 102. The passenger seats 102 are arranged in a row in the seat group 101. In some embodiments, the passenger seats 102 are arranged in a staggered configuration relative to the sidewall 103, although this is not intended to be limiting. In some embodiments, the passenger seats 102 are aligned relative to the sidewall 103. The passenger seat 102 is coupled to the floor 107. For example, the passenger seat 102 may be coupled to the floor 107 by a track or the like.

The aircraft 100 also includes the sidewall 103. The sidewall 103 includes one or more windows 110. The sidewall 103 is disposed adjacent to the seat groups 101. The seat groups 101 and the passenger seats 102 are disposed in-board of the sidewall 103 and the windows 110. The aircraft 100 also includes the overhead compartments 105 and the passenger service units 109. The overhead compartments 105 and the passenger service units 109 are disposed above the seat groups 101. The overhead compartments 105 and the passenger service units 109 are coupled to the sidewalls 103.

The passenger seats 102 may include, but are not limited to, an economy-class passenger seat, a business class passenger seat, a first-class passenger seat, a cabin attendant passenger seat, and the like. The passenger seats 102 are merely illustrative of the various embodiments of the present disclosure and are not intended to be limiting. The passenger seat 102 include one or more components, such as, but not limited to, a seat back 104, seat pan 106, arm rests 108, electrical loads 112, displays 114, electrical outlets 116, batteries 118, photovoltaic cells 122, seat group controllers 132, light pipes 144, and the like.

In embodiments, the seat back 104 and the seat pan 106 may be separate structures and/or may include one or more shared components. For example, the seat back 104 and the seat pan 106 can have a shared cushion or covering. The seat back 104 may also be configured to move relative to the seat pan 106. For example, the seat back 104 can be configured to transition between upright and reclining positions. In embodiments, the seat pan 106 can also be actuated such that the passenger seat 102 may be configurable between an upright position and a bed position (i.e., a lie-flat position), although this is not intended to be a limitation of the present disclosure. The passenger seat 102 may also include one or more arm rests 108. The arm rests 108 may be pivotally mounted to the passenger seat 102 by a pivot joint or another kinematic coupling.

The passenger seat 102 includes one or more electrical loads 112. The electrical loads 112 are an electrical component which operates using electric power. In some embodiments, the operates using less than 5 watts of electric power. In some embodiments, the operates using less than 1 watt of electric power. The electrical loads 112 may include, but are not limited to, a display 114, an electrical outlet 116, or the like.

The electrical loads 112 include the display 114. The display 114 is disposed in the seat back 104 of the passenger seat 102. The display 114 may be embodied using any display technology. For example, the display 114 may include a liquid crystal display (LCD), organic light emitting diode (OLED), e-paper, and the like for providing visual content. The display 114 may include speakers, headphones, or other devices for providing audio content.

In some embodiments, the display 114 is a reflective display. For example, the seat back display 114 may be an LCD without a backlight. The reflective display may be lit by ambient lighting within the aircraft 101. The reflective LCDs may have low uW/cm power requirements. In some embodiments, the display 114 is a low-power display. For example, the display 114 may operate on power of between 0.25 to 0.5 Watts. The low-power display may be desirable for enabling a wireless power system. In some embodiments, the display 114 is an interactive touch display. Thus, the display 114 may be referred to as a low-power, touch, reflective LCD without a backlight.

The electrical loads 112 also include the electrical outlet 116. The electrical outlet 116 may also be referred to as an electrical receptacle, a charging outlet, or the like. The electrical outlet 116 may include any suitable electrical outlet, such as, but not limited to, a universal serial bus (USB) charging outlet or the like. In some embodiments, the electrical outlet 116 is a low-voltage power outlet. The electrical outlets 116 may be used for charging a personal electronic device (PED).

The seat group 101 includes one or more batteries 118. In some embodiments, the seat group 101 include one of the batteries 118 which powers the electrical loads 112 of all of the passenger seats 102. In some embodiments, each of the passenger seats 102 include a battery 118. The batteries 118 may include a state of charge. The state of charge may also be referred to as a power level or the like. The state of charge is a level of charge of the batteries 118 relative to a capacity of the batteries 118. The state of charge may be measured as a percentage.

The batteries 118 deliver power to the electrical loads 112. For example, the batteries 118 deliver the power via one or more electrical wires. The batteries 118 are used for charging PEDs via the electrical outlets 116 and/or for powering the displays 114. Thus, the seat group 101 include intra-seat group wired power between the batteries 118 and the electrical loads 112.

The batteries 118 are rechargeable. In some embodiments, the batteries 118 are recharged using charge-pumping. Charge-pumping refers to using a DC-to-DC converter to generate a high bias voltage form a low-voltage supply. The batteries 118 may include one or more charge-pump circuits for performing the charge pumping. The batteries 118 may include any capacity. For example, the batteries may include a capacity between 400 to 3000 math, although this is not intended to be limiting. The batteries 118 may include any rechargeable battery, such as, but not limited to, a super capacitor, solid-state battery, or the like.

In embodiments, the aircraft 100 includes one or more arrays 120 and one or more photovoltaic cells 122. The one or more arrays 120 and one or more photovoltaic cells 122 form a wireless power system. The wireless power system may charge the batteries 118 and subsequently power the electrical load 112. The wireless power may reduce a weight of the aircraft 100 by removing a need for power cables to the seat groups 101. The wireless power system may also allow for reconfiguring the seat groups 101 without requiring to reconfigure the aircraft 100 for the power cables. For example, the batteries 118 are exclusively charged from the photovoltaic cells 122. By way of another example, the electrical loads 112 are exclusively powered by the batteries 118. Thus, the seat group 101 is not coupled to exterior power wires. For example, the seat group 101 is not coupled to the power wires running to the auxiliary power unit 136. The seat group 101 does include power wires running between the various electrical components of the seat group 101.

The seat group 101 includes the photovoltaic cells 122. The photovoltaic cells 122 may also be referred to as photovoltaics, collectors, solar collectors, solar cells, or the like. The photovoltaic cells 122 receive light (e.g., light 121, sunlight 123). The photovoltaic cells 122 convert the light into electricity 119. As may be understood, the photovoltaic cells 122 include an efficiency. For example, a portion of the light is converted to electricity 119, a portion of the light is reflected, a portion of the light heats the photovoltaic cells 122, and the like.

The photovoltaic cells 122 are coupled to the batteries 118. The electricity 119 generated by the photovoltaic cells 122 is used to charge the batteries 118. The electricity 119 from the photovoltaic cells 122 recharges the batteries 118. Thus, the photovoltaic cells 122 charge the batteries 118 in response to receiving light and converting the light to electricity 119. In some embodiments, the photovoltaic cells 122 may include one or more circuits (not depicted). The circuits may condition the electricity 119 for charging the batteries 118.

The light may also be referred to as electromagnetic radiation. The light propagates to the photovoltaic cells 122 through free-space in the aircraft 100. In some embodiments, the photovoltaic cells 122 receive light 121 from the arrays 120. In some embodiments, the photovoltaic cells 122 receive sunlight 123 from the sun. For example, the photovoltaic cells 122 may receive the sunlight 123 from the sun via the one or more windows 110. The sunlight 123 from the sun may also be referred to as solar radiation. In some embodiments, the photovoltaic cells 122 receive light 121 from the arrays 120 and sunlight 123 from the sun. In this regard, the sources of light in the aircraft include solar radiation and lighting from the arrays 120.

The aircraft 100 also includes the arrays 120. The arrays 120 emit light 121. The light 121 emitted by the arrays 120 include a power. In some embodiments, the light 121 emitted by the arrays 120 include a power of 5 watts or less. It is contemplated that the array 120 emitting light with a power of 5 watts can cause the photovoltaic cells 122 to provide nearly 0.5 watts of electrical power with ethe photovoltaics cells 122 being separated from the arrays 120 over a range of a couple of feet or less.

The power of the light 121 emitted by the arrays 120 are sufficiently low such that there is no harm to an eyeball directly in the line of sight of the arrays 120. In some embodiments, a radiance of the light 121 emitted by the arrays 120 does not exceed 5 milliwatts per square cm. In some embodiments, the radiance of the light 121 emitted by the arrays 120 does not exceed 0.01 milliwatts per square cm. In some embodiments, the array 120 meets eye safety standards. For example, the array 120 may be compliant with eye safety standards, such as, but not limited to, International Commission on Non-Ionizing Radiation Protection (ICNIRP) standards, American National Standards Institute (ANSI) laser direct and indirect light exposure guidelines, and the like.

The array includes LEDs 124 (light emitting diodes). In this regard, the array may also be referred to as an LED array, a diode bank, an array of diodes, or the like. The LEDs 124 spreads out the power of the array 120 over an area, thereby reducing the flux density as compared to a single diode with the same power. The LEDs 124 generate the light 121. The LEDs may include a power and a wavelength. In some embodiments, the LEDs 124 may be in the milliwatt-power range.

The LEDs 124 may be configured to emit light 121 at one or more wavelengths. Similarly, the photovoltaic cells 122 may be configured to receive and generate electricity from the light 121 at one or more wavelengths. In some embodiments, the light includes one or more of visible light (e.g., blue, red, green, etc.), infrared (IR) light, ultraviolet (UV) light, or the like. It is contemplated that the LEDs 124 may emit infrared light and the photovoltaic cells 122 may receive the infrared light. The infrared light may be desirable to prevent passengers from seeing the light while flying at night.

The array 120 may include any arrangement of the LEDs 124. In some embodiments, the array may be a rectangular array of the LEDs 124. In some embodiments, the LEDs 124 are omnidirectional. In some embodiments, the LEDs 124 are directional. In some embodiments, redundant of the LEDs 124 are installed in the array 120 at 2 or more different angles.

The arrays 120 may include a diffuser 126. The diffuser 126 may also be referred to as an optical spreader. The light 121 emitted from the LEDs 124 passes through the diffuser 126. The diffuser 126 spreads or diffuses the light from the LEDs 124. For example, the diffuser 126 may be engineered to spread light 121 from fewer higher-power diodes. The diffuser 126 may be made of any suitable material, such as, but not limited to, a semi-translucent material or the like.

The arrays 120 are disposed at one or more locations in the aircraft 100. In some embodiments, the aircraft 100 includes redundant of the arrays 120 installed at different angles or locations. For example, the arrays 120 include arrays 120a. The arrays 120a are coupled to the passenger service unit 109. The arrays 120a may also be referred to as overhead arrays. The arrays 120a have incumbent benefit in that the passenger service unit 109 has an overhead power control unit (PCU) chase for power to the passenger service unit 109. By way of another example, the arrays 120 include arrays 120b. The arrays 120b are coupled to the sidewall 103 below the windows 110. The arrays 120b may also be referred to as sidewall arrays. By way of another example, the arrays 120 include arrays 120c. the arrays 120c are coupled to the floor 107 below the passenger seats 102. The arrays 120c may also be referred to as floor arrays. The arrays 120 may include any combination of the arrays 120a, the arrays 120b, and the arrays 120c.

The photovoltaic cells 122 are disposed at one or more locations in the seat group 101. In some embodiments, the aircraft 100 includes redundant of the photovoltaic cells 122 installed at different angles or locations. For example, the photovoltaic cells 122 include photovoltaic cells 122a. The photovoltaic cells 122a are disposed on top of the seat back 104. The photovoltaic cells 122a receive light from the arrays 120a. The photovoltaic cells 122 may also be referred to as seat-top photovoltaic cells 122. By way of another example, the photovoltaic cells 122 include photovoltaic cells 122b. The photovoltaic cells 122b are coupled to the seat pan 106. The photovoltaic cells 122b are coupled to an outboard side of the seat pan 106. The photovoltaic cells 122b may also be referred to as seat pan photovoltaic cells. By way of another example, the photovoltaic cells 122 include photovoltaic cells 122c. The photovoltaic cells 122c are coupled to the passenger seat 102 below the seat pan 106. The photovoltaic cells 122c are aligned with of the arrays 120c. The photovoltaic cells 122c receive light from the arrays 120c. The photovoltaic cells 122c may also be referred to as under-seat arrays. By way of another example, the photovoltaic cells 122 include photovoltaic cells 122d. The photovoltaic cells 122d are disposed on an outboard side of the seat back 104. The photovoltaic cells 122d are disposed at a height of the windows 110. The photovoltaic cells 122d receive light from the windows 110. The photovoltaic cells 122d may also be referred to as window photovoltaic cells 122. The photovoltaic cells 122 may include any combination of the photovoltaic cells 122a, the photovoltaic cells 122b, the photovoltaic cells 122c, and the photovoltaic cells 122d.

In some embodiments, the aircraft 100 may include a combination of the arrays 120 and the photovoltaic cells 122. The combination may provide robust electrification to the seat group 101. Several arrays 120s and photovoltaic cells 122 provide opportunistic light power to enable a completely low-power wireless passenger seat electrification system. Additionally, the arrays 120 and the photovoltaic cells 122 are spread over a large area to reduce the individual power of the arrays 120. The array 120 and photovoltaic cells 122 are spaced apart at ranges compatible with the aircraft 100.

The aircraft 100 includes one or more array controllers 128. The array controller 128 may also be referred to as a diode controller. The arrays 120 are coupled to the array controllers 128. The array controllers 128 cause the arrays 120 to emit the light 121. The array controllers 128 control a power of the arrays 120. The array controllers 128 control the power of the light 121 emitted by the arrays 120. In some embodiments, the array controllers 128 control the power of the light 121 emitted by the arrays 120 by controlling which of the LEDs 124 are turned on, controlling an electrical power received by the LEDs 124, and the like.

The arrays controllers 128 may cause the arrays 120 to emit the light 121 according to one or more control schemes. In some embodiments, the arrays 120 continuously generate light for continuously causing the photovoltaic cells 122 to charge the batteries 118. For example, the arrays 120 continuously generate light when the auxiliary power unit 136 is turned on. The batteries 118 then have full capability to power the electrical loads 112. In some embodiments, the array controllers 128 cause the arrays 120 to emit the light 121 at a constant power. In some embodiments, the arrays controllers 128 cause the arrays 120 to emit the light 121 at a variable power. In some embodiments, the arrays controllers 128 cause the arrays 120 to emit the light 121 at a variable power based on a state-of-charge of the batteries 118. In some embodiments, the arrays controllers 128 cause the arrays 120 to emit the light 121 at a variable power based on the electricity 119 generated. In some embodiments, the arrays controllers 128 cause the arrays 120 to emit the light 121 based on feedback from the proximity sensor 130. The array controllers 128 may execute any of the various methods described further herein to implement the various control schemes. In some embodiments, the array controller 128 includes a memory, one or more processors, and/or a communication interface.

The seat group 101 includes one or more seat group controllers 132. In some embodiments, the seat group controller 132 includes a memory, one or more processors, and/or a communication interface. The seat group controller 132 is configured to transmit one or more signals to the array controller 128. For example, the seat group controller 132 may transmit a signal indicative of the state of charge of the battery 118. By way of another example, the seat group controller 132 may transmit a signal indicative of the electricity 119 generated by the photovoltaic cells 122. The seat group controller 132 is communicatively coupled to the batteries 118, the photovoltaic cells 122, the electrical loads 112, and/or the array controller 128.

The aircraft 100 includes the power sources 134. The power sources 134 are coupled to the arrays 120, the array controllers 128, and/or the proximity sensors 130. The arrays 120 may receive electrical power from the power sources 134 for emitting the light 121. The power sources 134 may include any power source, such as an auxiliary power unit 136 (APU), a solar window shade 138, and the like.

The power sources 134 include the auxiliary power unit 136 (APU). The auxiliary power unit 136 may include a generator or the like. The auxiliary power unit 136 may also be referred to as an aircraft electrical supply system or the like. The auxiliary power unit 136 generates power for auxiliary functions of the aircraft 100 other than propulsion. The auxiliary power unit 136 may also be referred to as an aircraft mains power or the like.

In some embodiments, the power sources 134 include the solar window shade 138. The solar window shade 138 is coupled to the window 110. The solar window shade 138 faces outwards or externally from the aircraft 100 to receive the sunlight 123 from the sun. The solar window shade 138 generates electricity from the sunlight 123. The solar window shade 138 generates the electricity from the sunlight 123 using one or more photovoltaic cells.

The solar window shade 138 may include one or more batteries 140. The batteries 140 are operable for storing electrical energy generated by the solar window shade 138. The batteries 140 are rechargeable batteries. In some embodiments, the batteries 140 are recharged using charge-pumping. The batteries 140 may include one or more charge-pump circuits for performing the charge pumping. The batteries 140 may include any rechargeable battery, such as, but not limited to, a super capacitor, solid-state battery, or the like.

In some embodiments, the batteries 140 are housed in a common housing within the solar window shade 138. For example, each of the windows 110 may include the solar window shade 138 with the battery 140 disposed within a housing of the solar window shade 138. In some embodiments, the batteries 140 are located remotely with respect to the physical location of the solar window shade 138. For example, each of the windows 110 may include the solar window shade 138. The batteries 140 of the solar window shades 138 may disposed within the overhead compartment 105, floor 107, and/or passenger service unit 109. The solar window shades 138 may then be electrically coupled to the batteries 140 which are disposed within the overhead compartment 105, floor 107, and/or passenger service unit 109. For instance, the solar window shades 138 may be electrically coupled to the batteries 140 which are disposed within the overhead compartment 105, floor 107, and/or passenger service unit 109 via wires (not depicted) disposed within the sidewall 103.

In some embodiments, the solar window shade 138 may be a primary power source of the arrays 120. In this regard, the arrays 120 may be powered from the solar window shade 138 when available. Such power from the solar window shade 138 may be considered green energy. The solar window shade 138 offloads power demands from the auxiliary power units 136. In this regard, the solar window shade 138 may become part of the wireless power seat charging system. The solar window shades 138 provides a higher power collective power solution.

The aircraft 100 includes one or more proximity sensors 130. The proximity sensors 130 may include cameras, eye trackers, human presence sensors, seat sensors, and the like. The proximity sensors 130 may generate one or more signals, such as, but not limited to, a seat-occupied signal, a seat-vacant signal, and the like.

It is contemplated that the displays 114 may receive video and/or audio information via any suitable means. In some embodiments, the aircraft 100 may include a router 142. The router 142 provides access to aircraft intranet. The router 142 may be communicatively coupled to the displays 114. In this regard, the displays 114 may wirelessly receive audio/ visual data from the router 142. The displays 114 then display the audio/visual data in response to receiving the audio/visual data. The seat group 101 does not include any in-flight entertainment cables for communicatively coupling the router 142 to the display 114.

In embodiments, the passenger seats 102 may include one or more light pipes 144. The light pipes 144 may also be referred to as light tubes or the like. The light pipes 144 may include optical fibers, hollow light waveguides, tubes lined with reflective material, fluorescent tubes, or the like. In some embodiments, the arrays 120 may emit visible light (e.g., light 121 in the visible spectrum). The visible light may be emitted from any of the arrays 120 (e.g., from the overhead, sidewalls, or floor). The visible light travels in free-space between the arrays 120 and the light pipes 144. Thus, the visible light may jump the gap between the arrays 120 and the light pipes. The light pipes 144 receive the visible light. In some embodiments, the arrays 120b emit the visible light. It is contemplated that the arrays 120b emitting the visible light may limit an amount of ambient light emitted into the seat group 101, which may be desirable while flying at night. In some embodiments, the light pipes 144 include an inlet 146. The light pipes 144 receive the light at the inlet 146.

The light pipes 144 may include one or more inlets 146. For example, the light pipes 144 may include at least one of an inlet 146a on top of the seat back 104, an inlet 146b disposed at the outboard side of the seat pan 106, or an inlet 146c disposed below the seat pan 106. The inlet 146a may receive light from the arrays 120a. The inlet 146b may receive light from the arrays 120b. The inlet 146c may receive light from the arrays 120c. It is contemplated that the inlet 146b and/or the inlet 146c may be more desirable than the inlet 146a. For example, emitting visible light from the arrays 120b to the inlet 146b and/or emitting visible light from the arrays 120c to the inlet 146c may desirably emit less ambient light to other seat groups in the aircraft 100 during nighttime flying, as compared to emitting visible light from the arrays 120a to the inlet 146a.

The displays 114 are coupled to the light pipes 144. The light pipes 144 include an outlet coupled to the displays 114. The light pipes 144 are routed from the seat pan 106, through the seat back 104, to the displays 114. The light pipes 144 transport the light from the inlet to the displays 114. The light pipes 144 transmit the light to the display 114 for backlighting the display 114. For example, the light pipe 144 may backlight an LCD stack of the display 114. In this regard, the arrays 120 directly backlights the display 114 via the light pipes. The light pipes 144 provide for wirelessly delivering visible piped light directly to displays 114 without LED-to-photovoltaic conversion. An intensity of the visible light may be electronically set or controlled by an integrated spatial light modulator (SLM) in the display 114. As much as half of the power of the display 114 may be to power a backlight of the display 114. Piping the visible light may provide significant energy savings. By piping visible light for display backlighting from the aircraft to seats, the power conversion losses of the photovoltaic cells 122 is avoided. It is contemplated that light piping the visible light to the displays 114 may reduce a power requirement of the arrays 120 by up to 80%, as compared to backlighting the display 114 using the batteries 118.

In some embodiments, the light pipes 144 are used in combination with the photovoltaic cells 122. For example, the light pipes 144 may backlight the displays 114 and the photovoltaic cells 122 may generate electricity used for modulating the LCD stack of the displays 114 to generate one or more visual images.

Figure 2:
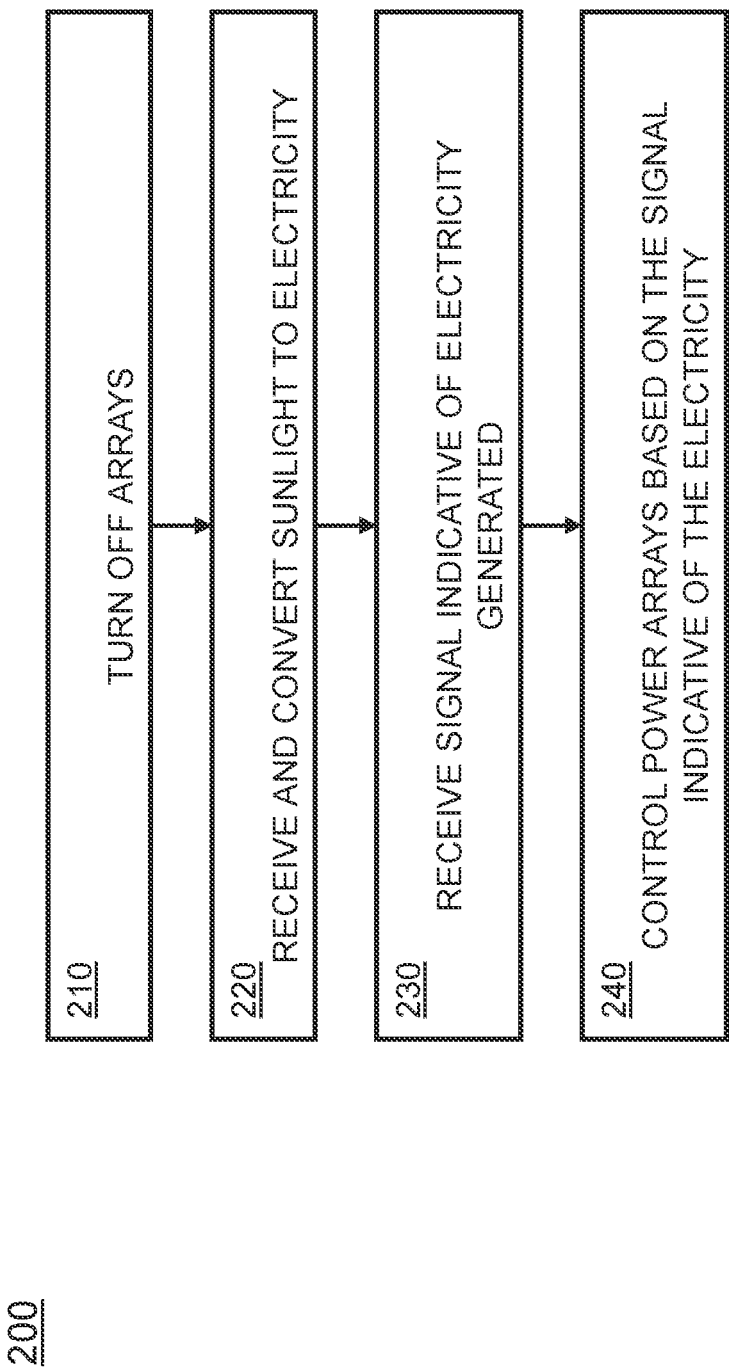
FIGS. 2-6 depict a flow diagram of a method, in accordance with one or more embodiments of the present disclosure.

Referring now to FIG. 2, a flow diagram of a method 200 is described, in accordance with one or more embodiments of the present disclosure. The method 200 describes a control scheme for the array controller 128. The method is a control scheme based on the availability of the sunlight 123 from the sun. The array controllers 128 detect when the photovoltaic cells 122 receive sunlight 123 and reduce the power of the arrays 120 in response to detecting the photovoltaic cells 122 receive the sunlight 123. The array controller 128 throttles the electrical power provided to the arrays 120 though wireless feedback when sunlight 123 through the window 110 is available. Taking advantage of free power from the sun is desirable to reduce the power demand on the power sources 134. In this regard, the photovoltaic cells 122d disposed on the outboard side of the seat back 104 nearest the window 110 will receive indirect ambient light. It is contemplated that the sunlight 123 may provide anywhere from about 10% to 100% of the power requirements of the electrical loads 112.

In a step 210, the array controllers 128 turn off the arrays 120. The arrays 120 do not emit the light 121 when the arrays 120 are turned off.

In a step 220, the photovoltaic cells 122 receive sunlight 123 and convert the sunlight 123 into electricity 119. The seat group controller 132 transmits a signal indicative of the electricity 119 generated by the photovoltaic cells 122 from the sunlight 123 to the array controllers 128. For example, the signal indicative of the electricity 119 may be a measurement of a current of the electricity 119.

In a step 230, the array controllers 128 receive the signal indicative of the electricity 119 generated by the photovoltaic cells 122 from the sunlight.

In a step 240, the array controllers 128 cause the arrays 120 to emit the light 121. The array controllers 128 control the power of the arrays 120 based on the signal indicative of the electricity 119 generated by the photovoltaic cells 122 from the sunlight 123.

Figure 3:
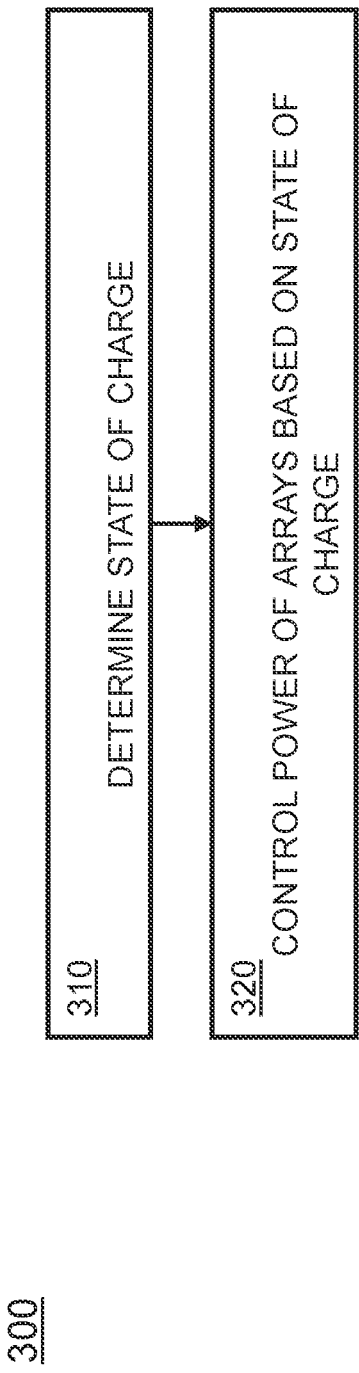

Referring now to FIG. 3, a flow diagram of a method 300 is described, in accordance with one or more embodiments of the present disclosure. The method 300 describes a control scheme for the array controller 128. The method is a control scheme based on the state of charge of the batteries 118. The array controllers 128 are configured to detect a state of charge of the batteries 118 and control the power of the arrays 118 based on the state of charge.

In a step 310, the seat group controllers 132 determines the state of charge. The seat group controllers 132 may determine the state of charge using any suitable technique, such as, but not limited to, chemical methods, voltage methods, current integration, and the like. The seat group controllers 132 then transmits the state of charge of the batteries 118 to the array controllers 128. The array controllers 128 receives the state of charge of the batteries 118 from the seat group controllers 132. Thus, the array controllers 128 are configured to detect the state of charge by receiving the state of charge from the seat group controllers 132.

In a step 320, the array controllers 128 control the power of the arrays 120 based on the state of charge of the batteries 118. The array controllers 128 may increase the power of light 121 emitted by the arrays 120 in an inversely proportional manner to the state-of-charge. In this regard, as the state-of-charge decreases the power of light 121 emitted by the arrays 120 increases. Similarly, as the state-of-charge increases the power of light 121 emitted by the arrays 120 decreases.

Figure 4:
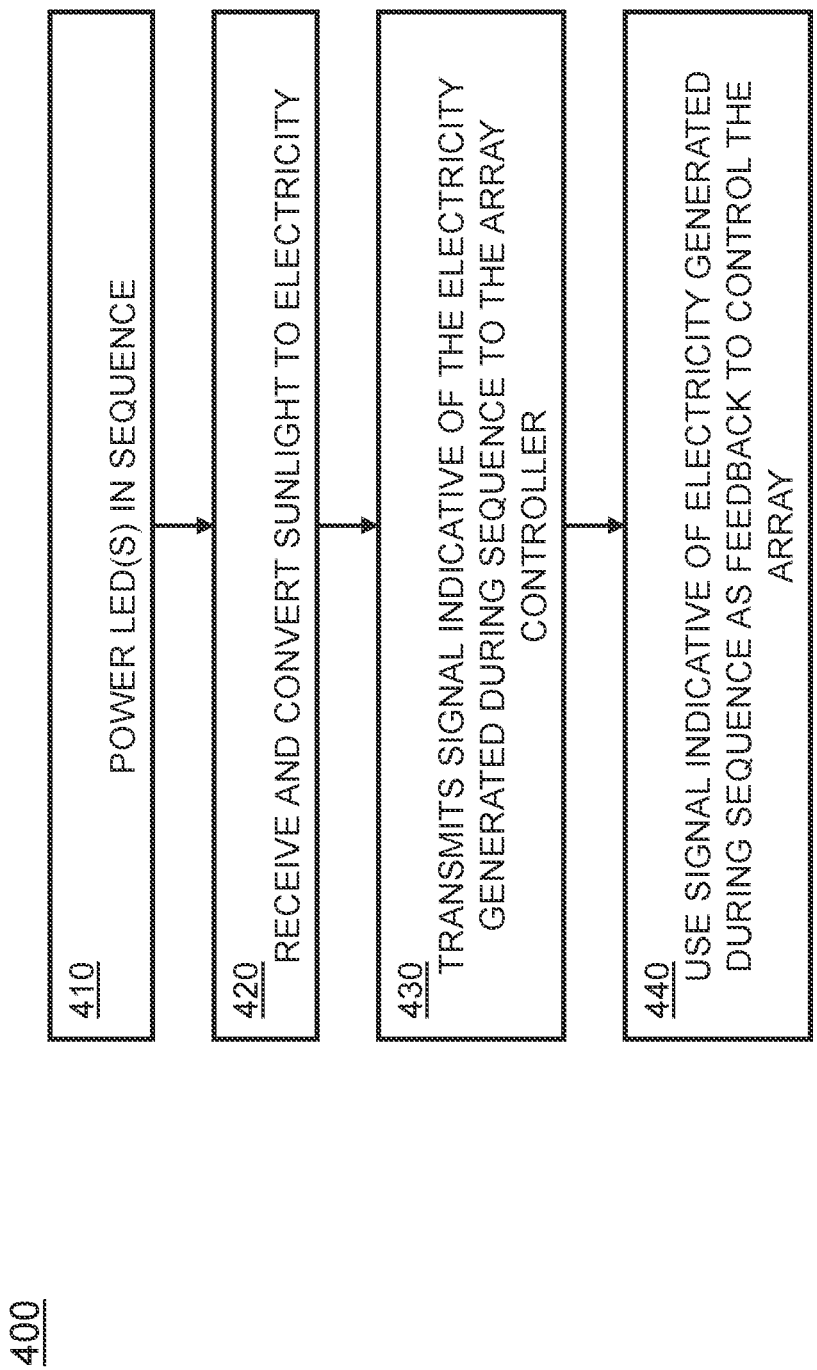

Referring now to FIG. 4, a flow diagram of a method 400 is described, in accordance with one or more embodiments of the present disclosure. The method 400 describes a control scheme for the array controller 128. The method is a control scheme based on the which of the arrays 120 cause the photovoltaic cells 122 to generate the electricity 119 most efficiently. The array controllers 128 turn on and off the LEDs 124 of the arrays 120 (e.g., array 122a) to detect a position of the seat back 104 using a feedback mechanism from the photovoltaic cells 122. The LEDs 124 are selected by the arrays 120 by continuous feedback. The array controller 128 may accommodate for the position of the seat back 104 without having direct knowledge of the position of the seat back 104.

In a step 410, the array controllers 128 power the LEDs 124 of the arrays 120 in a sequence. For example, the array controllers 128 power the LEDs 124 of the arrays 120 turning rows of the LEDs 124 on and off in a sequence. The LEDs 124 emit the light 121 in the sequence.

In a step 420, the photovoltaic cells 122 receives the light generated by the LEDs 124 of the arrays 120 in the sequence and converts the light to electricity 119. The electricity 119 generated may vary during the sequence. For example, the electricity 119 generated during the sequence may vary according to the alignment of the arrays 120 and the photovoltaic cells 122. If a position of the seat back 104 is adjusted, the alignment of the arrays 120 and the photovoltaic cells 122 may become misaligned. The misalignment may cause the photovoltaic cells 122 to receive less of the light 121, thereby reducing an efficiency of the wireless power transfer. In this regard, some of the rows of LEDs 124 of the arrays 120 may be misaligned.

In a step 430, the seat group controllers 132 transmits a signal indicative of the electricity 119 generated during the sequence to the array controllers 128. For example, the signal indicative of the electricity 119 may be a value of a current of the electricity 119. the array controllers 128 receives the signal indicative of the electricity 119 generated during the sequence.

In a step 440, the array controllers 128 use the signal indicative of the electricity 119 generated during the sequence as feedback to control the arrays 120. For example, the array controllers 128 power on the LEDs 124 which cause the photovoltaic cells 122 to generate a largest amount of the electricity 119.

In some embodiments, the array controller 128 may perform the method 400 during initialization of the controller 128 (e.g., as the auxiliary power unit 136 is powered on). In some embodiments, the array 128 controller may iteratively perform the method 400. For example, the array controller 128 may iteratively perform the method at a time interval.

Figure 5:
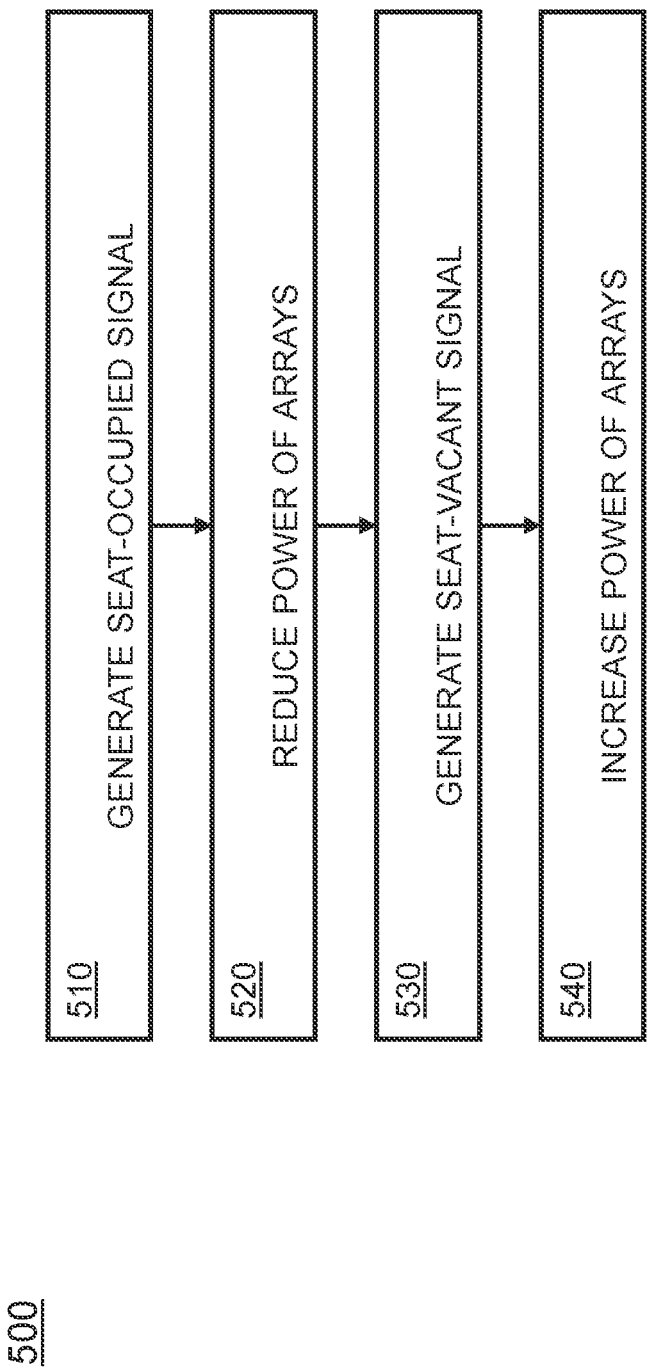

Referring now to FIG. 5, a flow diagram of a method 500 is described, in accordance with one or more embodiments of the present disclosure. The method 500 describes a control scheme for the array controller 128. The method is a control scheme based on a control loop form the proximity sensor 130.

In a step 510, the proximity sensor generates a seat-occupied signal. The seat-occupied signal indicates a human presence in the seat group 101.

In a step 520, the array controller 120 receives the seat-occupied signal and reduces power of the arrays 120 in response to receiving the seat-occupied signal. The array controllers 120 may reduce power to the arrays 120 to meet one or more light exposure guidelines. In this regard, the proximity sensor 130 in a control loop is one means for assisting addressing ICNIRP light safety guidelines to limit exposure of incoherent visible and visible Infrared radiation.

In a step 530, the proximity sensor generates a seat-vacant signal. The seat-vacant may indicate a lack of a human presence in the seat group 101.

In a step 540, the array controller 120 receives the seat-vacant signal and increases the power to the arrays 120 in response to receiving the seat-vacant signal. The array controller 120 increases power to the arrays 120 to improve light power link budgets where there is positively no chance of direct or indirect luminance safety issues. When there is no one in the seat group 101, the power level of the arrays 120 is increased to charge the batteries 118 more rapidly. The higher power level is no longer a concern regarding the human safety standards due the lack of human presence.

In some embodiments, the LEDs 124 may also include UV LEDs. The UV LEDs may include UVA and/or UVB. The UV LEDs may generate UV light. The UV Light is distributed throughout the passenger and crew areas used to disinfect the aircraft 100, seats group 101, and floor 107. The UV LEDs may be powered on when the array controller 120 receives the seat-vacant signal. In this regard, the proximity sensor 130 may be used as a safety interlock where there is zero chance for emitting UV light onto humans.

Figure 6:
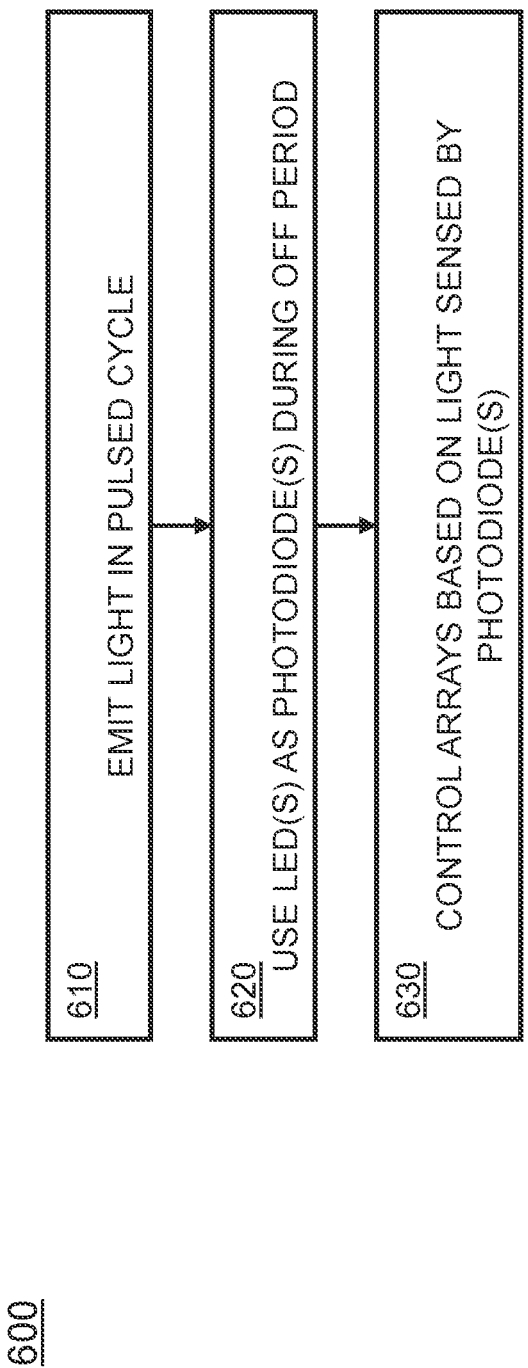

Referring now to FIG. 6, a flow diagram of a method 600 is described, in accordance with one or more embodiments of the present disclosure. The method 600 describes a control scheme for the array controller 128. The method is a control scheme based on a detecting light from the LEDs 124 of the arrays 120.

In a step 610, the LEDs 124 of the arrays 120 emit light in pulsed cycle. The pulsed cycle includes on periods and off periods for the LEDs 124.

In a step 620, one or more of the LEDs 124 of the arrays 120 are used as a photodiode. The photodiode detects light during off periods for the LEDs 124. The light may include the In-band light which is emitted by the LEDs 124. All or subset of the LEDs 124 may be used to detect the light during off periods for the LEDs 124.

In a step 630, the array controllers 128 receive the light sensed by the photodiodes and controls the arrays 120 based on the light sensed by the photodiodes. The array controllers 128 may cause the arrays 120 to reduce a power below a power threshold. The power threshold may be compliant with one or more safety standards. For example, any abnormally reflected light detected by the LEDs 124 in the array 120 is amplified and used as a positive interlock to reduce or cut off power to the array 120 and the LEDs 124. The power to the arrays 120 may be reduced until the fault is no longer detected. In this regard, one or more of the LEDs 124 of the array is configured as a photodiode and the array controller 128 is configured to adjust the power emitted by the arrays 120 based on a signal from the photodiode.

Referring generally again to FIGS. 1A-6. In some embodiments, the aircraft 100 may electrically close the solar window shades 138 to facilitate an efficient use of the sunlight 123. The aircraft 100 may electrically close the solar window shades 138 in unison or individually.

Photovoltaic cells can include mono-crystalline cells, multi-crystalline cells, amorphous silicon photovoltaic cells, compound semiconductor photovoltaic cells, and the like. Photovoltaic cells may include the multi-crystalline type due to cost and ability to sustain a longer period in which to generate electricity. Photovoltaic cell size may vary and module size may vary. The photovoltaic cells may be covered in one or more films. For example, the photovoltaic cells may be covered in polyvinyl fluoride (PVF), ethylene/tetrafluoroethylene (ETFE), ethylene vinyl acetate (EVA), ethylene-methyl acrylate copolymer (EMA), ethylene-ethyl acrylate copolymer (EEA), and the like.

A controller may include a memory. The memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

A controller may include one or more processors. The processors may include any processing unit known in the art. For example, the processors may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A controller may include a communication interface. The communication interface may communicatively couple to the various other components of the aircraft in any manner known in the art. For example, the various processors or memory may be communicatively coupled to each other and other components via a wireless connection (e.g., RF coupling, IR coupling, data network communication (e.g., WiFi, WiMax, Bluetooth and the like). The communication interface may thus include wireless-based interfaces employing GSM, GPRS, CDMA, EV-DO, EDGE, WiMAX, 3G, 4G, 4G LTE, 5G, WiFi protocols, RF, LoRa, and the like.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A seat group comprising:
   a passenger seat comprising:
      a seat back;
      a seat pan; and
      one or more electrical loads;
   one or more photovoltaic cells coupled to the passenger seat; wherein the one or more photovoltaic cells are configured to receive light and convert the light into electricity; one or more batteries; wherein the one or more batteries are rechargeable;
   wherein the electricity from the one or more photovoltaic cells recharges the one or more batteries; wherein the one or more batteries deliver power to the one or more electrical loads;
   one or more arrays associated with the seat group; wherein the one or more arrays each comprise a plurality of light emitting diodes; wherein the one or more arrays are configured to emit the light; wherein the light propagates to the one or more photovoltaic cells in free space; and
   an array controller; wherein the array controller is configured to control a power of the one or more arrays; wherein the array controller is configured to turn on and off the plurality of light emitting diodes of the one or more arrays to detect a position of the seat back using a feedback mechanism from the one or more photovoltaic cells.

2. The seat group of claim 1, wherein the one or more electrical loads comprise at least one of:
   a display; wherein the display is disposed in the seat back; or
   an electrical outlet.

3. The seat group of claim 2, comprising a light pipe; wherein the one or more electrical loads comprise the display; wherein the light pipe is configured to receive the light and transport the light to the display for backlighting the display.

4. The seat group of claim 3, wherein the light pipe comprises an inlet; wherein at least one of: the inlet is on top of the seat back, the inlet is disposed at an outboard side of the seat pan, or the inlet is disposed underneath the seat pan; wherein the light pipe receives the light at the inlet.

5. The seat group of claim 1, wherein the one or more batteries are exclusively charged from the one or more photovoltaic cells; wherein the one or more electrical loads are exclusively powered from the one or more batteries.

6. An aircraft comprising:
   a seat group comprising:
      a passenger seat comprising:
         a seat back;
         a seat pan; and
         one or more electrical loads;
      one or more photovoltaic cells coupled to the passenger seat; wherein the one or more photovoltaic cells are configured to receive light and convert the light into electricity; and
      one or more batteries; wherein the one or more batteries are rechargeable; wherein the electricity from the one or more photovoltaic cells recharges the one or more batteries; wherein the one or more batteries deliver power to the one or more electrical loads;

one or more arrays; wherein the one or more arrays each comprise a plurality of light emitting diodes; wherein the one or more arrays are configured to emit the light; wherein the light propagates to the one or more photovoltaic cells in free space; and an array controller; wherein the array controller is configured to control a power of the one or more arrays; wherein the array controller is configured to turn on and off the plurality of light emitting diodes of the one or more arrays to detect a position of the seat back using a feedback mechanism from the one or more photovoltaic cells.

7. The aircraft of claim 6, wherein the light comprises at least one of visible light, infrared light, or ultraviolet light.

8. The aircraft of claim 6, wherein the one or more arrays comprise a diffuser; wherein light emitted from the plurality of light emitting diodes passes through the diffuser.

9. The aircraft of claim 6, comprising a passenger service unit; wherein the one or more arrays comprise a passenger service unit array; wherein the passenger service unit array is coupled to the passenger service unit; wherein the one or more photovoltaic cells comprise one or more seat-top photovoltaic cells; wherein the one or more seat-top photovoltaic cells are disposed on top of the seat back; wherein the one or more seat-top photovoltaic cells receive light from the passenger service unit array.

10. The aircraft of claim 6, comprising a sidewall; wherein the one or more arrays comprise a sidewall array coupled to the sidewall; wherein the one or more photovoltaic cells comprise one or more seat pan photovoltaic cells; wherein the one or more seat pan photovoltaic cells are coupled to the seat pan; wherein the one or more seat pan photovoltaic cells are configured to receive the light from the sidewall array.

11. The aircraft of claim 10, comprising a light pipe; wherein the one or more electrical loads comprise a display; wherein the light pipe is configured to receive the light from the sidewall array and transport the light to the display for backlighting the display.

12. The aircraft of claim 6, comprising a floor; wherein the one or more arrays comprise a floor array coupled to the floor below the passenger seat; wherein the one or more photovoltaic cells comprise one or more under-seat photovoltaic cells; wherein the one or more under-seat photovoltaic cells are coupled to the passenger seat below the seat pan; wherein the one or more under-seat photovoltaic cells are configured to receive the light from the floor array.

13. The aircraft of claim 6, comprising a window; wherein the one or more photovoltaic cells comprise one or more window photovoltaic cells; wherein the one or more window photovoltaic cells are disposed at a height of the window; wherein the one or more window photovoltaic cells are configured to receive sunlight from the window.

14. The aircraft of claim 6, comprising one or more power sources; wherein the one or more arrays receive electrical power from the one or more power sources for emitting the light; wherein the one or more power sources comprise an auxiliary power unit.

15. The aircraft of claim 14, comprising a window; wherein the one or more power sources comprise a solar window shade; wherein the solar window shade is coupled to the window; wherein the solar window shade receives sunlight and generates electricity from the sunlight.

16. The aircraft of claim 6, wherein the array controller is configured to detect when the one or more photovoltaic cells receive sunlight and reduce the power of the one or more arrays in response to detecting the one or more photovoltaic cells receive the sunlight.

17. The aircraft of claim 6, wherein the array controller is configured to detect a state of charge of the one or more batteries and control the power of the one or more arrays based on the state of charge.

18. The aircraft of claim 6, comprising a proximity sensor; wherein the proximity sensor is configured to generate a seat-occupied signal and a seat-vacant signal; wherein the array controller is configured to reduce the power of the one or more arrays in response to receiving the seat-occupied signal; wherein the array controller is configured to increase the power of the one or more arrays in response to receiving the seat-vacant signal.

* * * * *